Nov. 24, 1942.   J. B. DYER   2,302,687
ENGINE CONTROL APPARATUS
Filed Jan. 28, 1933   4 Sheets-Sheet 2

INVENTOR
John B. Dyer
BY Spencer Hardman
and Icho
ATTORNEYS

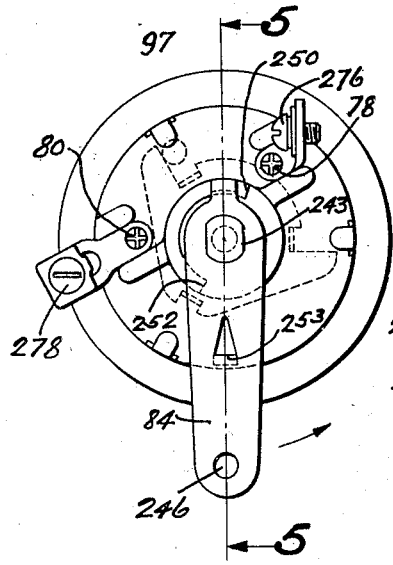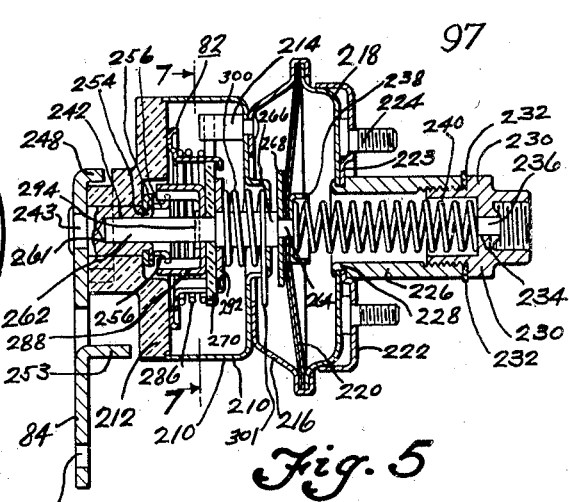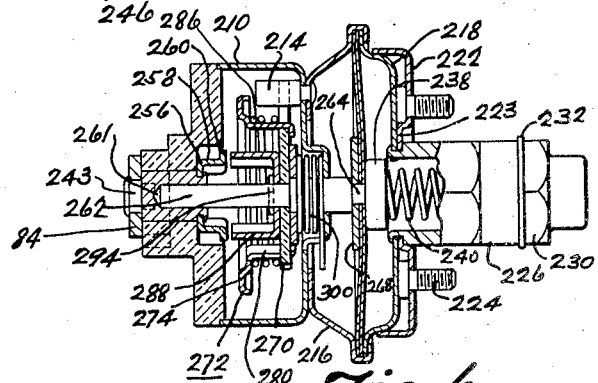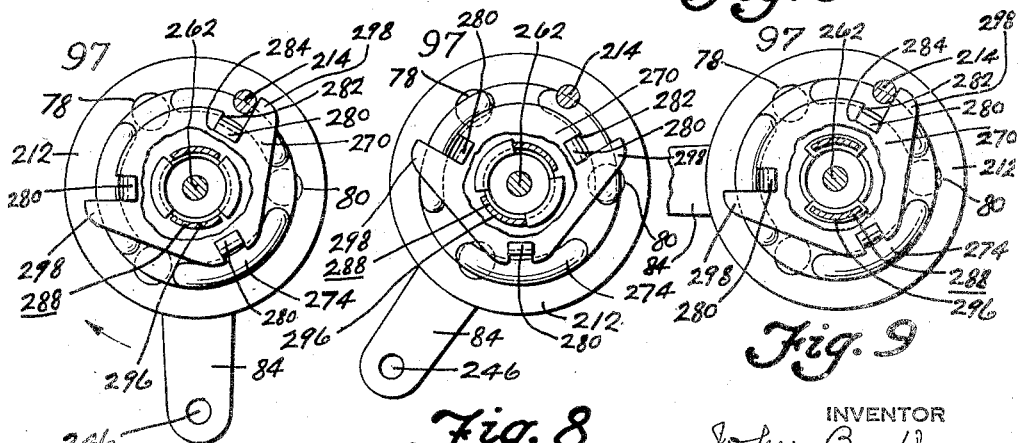

Nov. 24, 1942.   J. B. DYER   2,302,687
ENGINE CONTROL APPARATUS
Filed Jan. 28, 1933   4 Sheets-Sheet 4
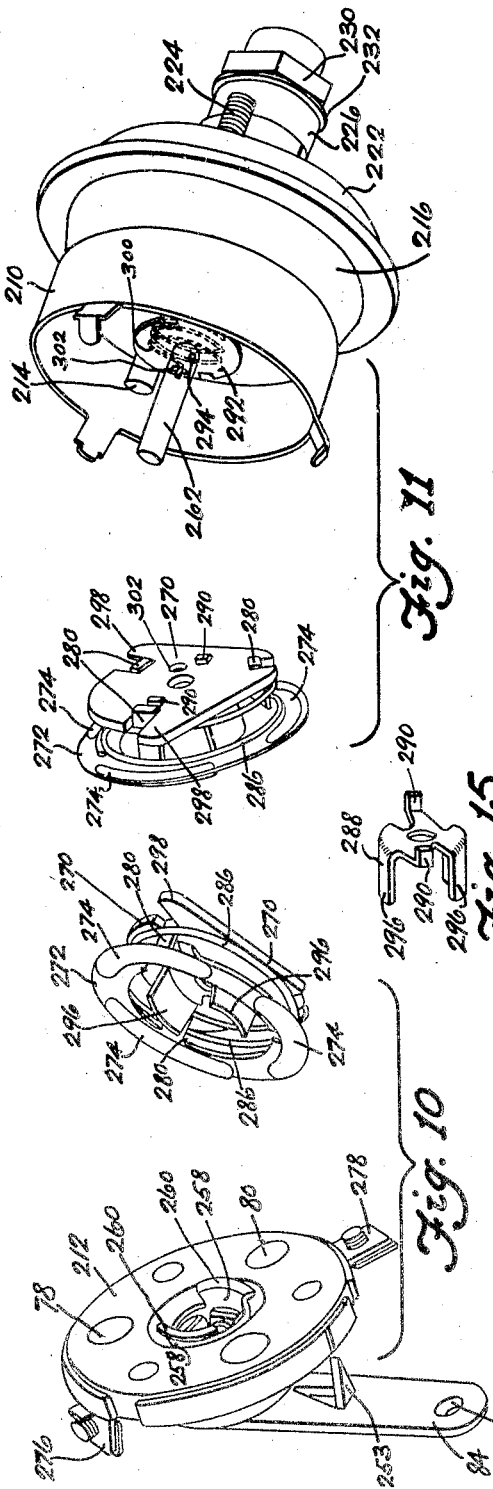
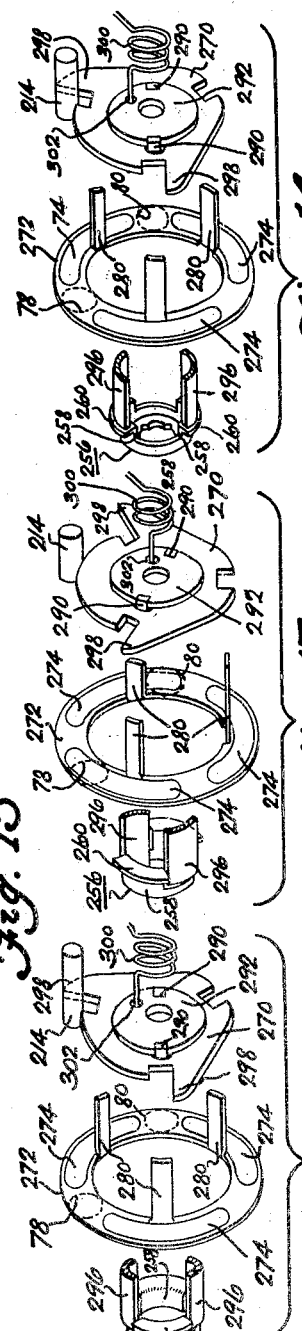
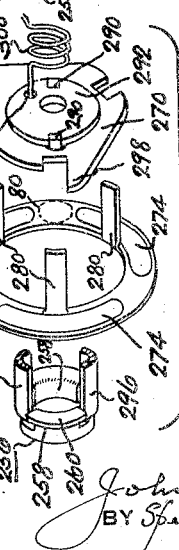
INVENTOR
John B. Dyer
BY Spencer Hardman
and Fehr
ATTORNEYS Patented Nov. 24, 1942

2,302,687

UNITED STATES PATENT OFFICE 2,302,687

ENGINE CONTROL APPARATUS

John B. Dyer, Pendleton, Ind., assignor, by mesne assignments, to General Motors Corporation, Detroit, Mich., a corporation of Delaware Application January 28, 1933, Serial No. 653,983

38 Claims. (Cl. 290—37)

This operation relates to apparatus for controlling the operation of internal combustion engines, more particularly those of automotive vehicles and especially, to apparatus for controlling the starting devices of such engines.

It is the general object of this invention to provide a starter control device including electrical means for causing the starting motor to become operative to start the engine and means for causing said electrical means to operate in response to the operation of one or more of the control devices which must be actuated by the operator of the engine or vehicle to control the operation thereof under ordinary operating conditions, such, for instance, as the accelerator pedal which controls the quantity of combustible mixture supplied to the engine in combination with means operated automatically by the engine itself for causing the starting devices to become inoperative and to prevent such starting devices from becoming operative as long as the engine is operating under its own power.

More specifically, it is the object of this invention to provide a starter control device of the type referred to, in which the electrically operated means is so constructed that it employs a minimum of current during its operation so as to exhaust the battery to the least possible extent during the starting operation and to reduce the cost of such electrical devices to as great an extent as possible.

According to this invention, these objects are accomplished by the provision of an electromagnet which is operable to close the starting motor switch, to shift the pinion driven by the starting motor into engagement with the engine flywheel gear and to control the disengagement of the pinion from such gear when the magnet is de-energized, and which is provided with a plurality of coils having a different number of turns and different resistances. The magnet is in circuit with a magnetic switch which, when closed, causes both coils of the magnet to become energized, the closing of the magnetic switch being effected by the closing of the ignition switch and a second switch which is closed by the accelerator pedal so that when these two switches are closed, both coils of the magnet exert a pull on the armature thereof so as to close the circuit of the starting motor and to concurrently shift the driving pinion of said motor into engagement with the engine flywheel. When the starting motor circuit is closed, one of the coils of the magnet is shunted out so that only one of said coils remains effective to hold the switch controlling the starting motor circuit in closed position and the motor driven pinion in gear engaging position during the engine cranking operation.

When the engine begins to run under its own power, the switch operated by the accelerator pedal is opened automatically by engine suction to render the magnet entirely inoperative while the magnetic switch may be caused to open by counter voltage built up by action of the generator when the engine is running at a predetermined speed to also render the magnet inoperative so that when the engine begins to run under its own power, the circuit through the magnet coils may be broken either by action of engine suction or by operation of the generator.

The pull of the holding coil is insufficient to shift the starter pinion into gear engaging position and to close the starter switch but is sufficient to hold the gear in engagement and switch closed after such operations have been accomplished by the effect of both coils.

The switch which is controlled by operation of the accelerator pedal and engine suction is so constructed that in the event of the engine suction falling, under any operating conditions to such a degree that the suction is insufficient to hold the switch open, such switch is prevented from closing until the accelerator pedal is restored to its normal inoperative or closed throttle position.

Further objects and advantages of the present invention will be apparent from the following description, reference being had to the accompanying drawings wherein a preferred embodiment of the present invention is clearly shown.

In the drawings:

Fig. 3 is a detail view of the switch controlling the circuit of the starting motor partly in section on line 2—3 of Fig. 2a.

Fig. 4 is an end elevation of the accelerator operated switch.

Fig. 5 is a section on the line 5—5 of Fig. 4 with the parts in normal inoperative position.

Fig. 6 is a partial section on the same line as Fig. 5 showing the parts in position corresponding to full open position of the accelerator pedal and the switch contacts in open position.

Figs. 7, 8 and 9 are sectional views on the line 7—7 of Fig. 5 showing parts in elevation and showing the position of the switch contacts and associated parts in inoperative, cranking and running positions respectively.

Fig. 10 is a perspective view of the plate carrying the fixed switch contacts and the subassembly unit which includes the movable switch contact and supporting plate therefor.

Fig. 11 is a perspective view of the subassembly unit viewed from a different direction and the main switch housing.

Figs. 12, 13 and 14 are exploded views showing the position of the various separate parts shown in Figs. 7, 8 and 9 respectively.

Fig. 15 is a perspective view of one of the clutch members shown in Figs. 10 to 14.

Figure 1:
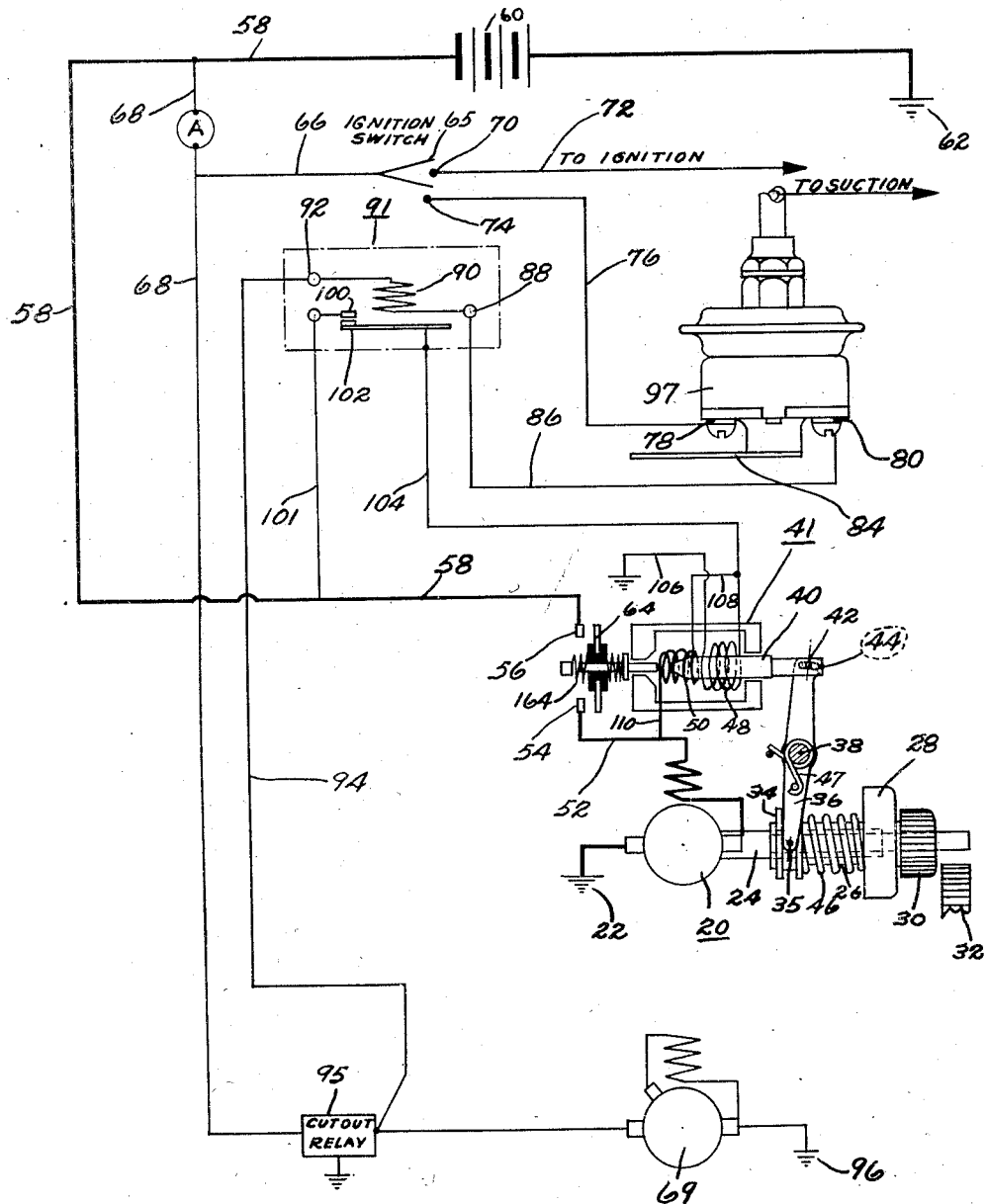
Fig. 1 is a wiring diagram of this invention.

Referring to Fig. 1 of the drawings, the starting motor which is indicated at 20, has a ground connection 22 and an armature shaft 24, on which is splined a sleeve 26 which is secured to one member of an overrunning clutch 28, the other member of which is integral with the driving pinion 30 adapted to be moved into engagement with the flywheel gear 32 of the engine in order to turn said gear and start the engine whenever the starting motor is operative. The sleeve 26 is moved to the right in Fig. 1 to effect engagement of the pinion 30 with the gear 32 and the circuit between the starting motor and the battery is concurrently closed to cause the starting motor to become operative.

To this end the sleeve 26 is provided with a grooved collar 34 which is slidable on the shaft 24 and said collar is engaged by pins 35 which project from a yoke formed on the lower end of a lever 36 suitably pivoted at 38 and connected at the upper end with the armture 40 of an electromagnet 41 more specifically described later, by means of a lost motion connection comprising the pin 42 and slot 44 which is provided for a purpose to be described more fully hereinafter. When the electromagnet is energized, the lever 36 is rocked in a counter-clockwise direction, the collar 34 compressing a spring 46 which surrounds the sleeve 26 between the collar and the clutch 28 to move the pinion into engagement with the flywheel gear in the usual manner, the construction of the driving mechanism between the starting motor and the engine flywheel being the same as is ordinarily employed in manually operated starters of the overrunning clutch type. A spring 47 returns the lever 36 and the parts operated thereby to normal position when the magnet 41 is de-energized.

The electromagnet 41 is provided with two coils 48 and 50 having different numbers of turns, for a purpose set forth more fully hereinafter and the specific circuit connections of the magnet coils will be also described more fully later.

The starting motor is connected by the wire 52 with a fixed contact 54 of a starting motor switch, while a second fixed contact 56 is connected by a wire 58 to a battery indicated at 60 and grounded at 62. A movable contact 64 is adapted to be moved into engagement with the two contacts 54 and 56 when the armature of the electromagnet 41 is moved to the left in Fig. 1 upon energization of the two coils of said magnet previously referred to, to close the circuit of the starting motor.

The energization of the electromagnet is effected by the closing of the ignition switch and a second switch indicated in its entirety by numeral 97 and adapted to be closed by movement of the accelerator pedal to open the carburetor throttle, and the closing of these switches effects closing of a magnetic switch which is in circuit with the magnet coils. The ignition switch has a movable contact 65 connected by a wire 66 to a wire 68 extending from the wire 58 to the generator 69, as hereinafter more fully described. The movable contact 65 is a double contact, one branch of which engages a fixed contact 70 to which is connected a wire 72 leading to the ignition apparatus of the engine and a second fixed contact 74 which is connected by a wire 76 with a fixed contact 78 of the switch 97 which is provided with a second fixed contact 80, these two contacts being adapted to be engaged by a movable contact 82 best shown in Figs. 5, 10 and 13, and operated by an arm 84, which is connected by mechanism not shown herein, to the accelerator pedal, as previously set forth. The fixed contact 80 is connected by a wire 86 with a terminal 88, which is connected with the winding 90 of a relay or magnetic switch indicated in its entirety by the reference number 91, the other end of said winding being connected to the terminal 92 which is connected by a wire 94 with the wire 68 which leads from the battery to the generator 69 between said generator and the usual cut-out relay 95 which is provided between the generator and the battery. The generator is grounded by the connection 96.

The closing of the ignition switch and the switch 97 causes energization of the winding 90 of the relay above referred to, which closes the magnetic switch and closes the circuit through the two coils 48 and 50 of the electromagnet 41. To this end a fixed contact 100 of the relay is connected by wire 101 with the wire 58 leading from the battery to one contact of the starter switch, and a movable contact 102 of said relay is connected by wire 104 directly with the coil 48 which is grounded by connection 106. The wire 104 is also connected to a wire 108 which leads to and is connected with the coil 50, the other end of which is connected by a wire 110 with the wire 52 which leads from the fixed contact 54 of the starting motor switch to the starting motor.

Obviously, when the switch of the relay 91 is closed, current will flow from the battery to ground through the connection 62 and from the battery through the wire 58, wire 101, the relay switch, wires 104 and 108 to the two coils 48 and 50 and from the coil 48 through the connection 106 to ground, while current passes from the coil 50 through the wire 110, wire 52, the starting motor and the connection 22 to ground. Thus whenever the switch of the relay 91 is closed, current will flow from the battery through the coils 48 and 50 of the electromagnet and the magnetic pull of both of these coils is operative to shift the armature 40 to the left. The shifting of this armature effects, first, the shifting of the pinion 30 into mesh with the gear 32, second, moves the contact 64 into engagement with the contacts 54 and 56 to close the starting motor circuit and third, as will be explained more fully later, presses the contact 64 firmly against the two contacts 54 and 56 with a considerable degree of pressure so as to make a proper contact at the starting motor switch.

As soon as contact is made between the contact 64 and the contacts 54 and 56, the coil 50 is shunted out and becomes ineffective to exert any pull on the armature because as will be obvious upon inspection of the diagram, after the contact 64 engages the contacts 54 and 56, current will flow directly through the wire 58 and through the starting motor switch, wire 52, and the starting motor to ground and simultaneously will flow through the wire 101, the relay switch 91, wire 104, coil 48 and connection 106 to ground, but the circuit comprising the wire 101, the relay switch 91, wire 104, wire 108, coil 50 and wire 110 forms a shunt through which current will not flow appreciably as long as the current flows directly through the wire 58, the starter switch and wire 52 to the starting motor. Therefore, after the starting motor switch is closed and during the operation of the starting motor to crank the engine, the armature 40 is held in its left hand position only by the force exerted through the energization of the coil 48, which, as previously stated, is sufficient to hold the armature in such position, but insufficient to move the armature. This is due to the fact that after the armature has been shifted, the inertia of the parts and the effect of the air gap do not have to be overcome and that less force is required to hold the armature in switch closing position than to move it to such position.

The path of the current, when the ignition switch and switch 97 are closed, to effect energization of the winding 90 and closing of the relay switch is as follows: from the battery through the wire 62 to ground and from the battery through the wires 58, 68, 66, the ignition switch, wire 76, the switch 97, wire 86, the winding 90, wire 94, and wire 68 to the generator 69 and through the connection 96 to ground again. Upon opening of the ignition switch manually or upon opening of switch 97 by engine suction, as previously referred to, the winding 90 is necessarily de-energized to effect opening of the relay switch. Also the generator when operating at a predetermined speed builds up a counter-voltage in the winding 90 through the connection of said winding with the wire 94 which connects with wire 68 between the generator and the cut-out relay, which causes the winding to become de-energized and the relay switch to open, so that after the magnet has closed the starting motor switch and shifted the pinion 30 into mesh with gear 32, the starting motor is rendered inoperative automatically either by the action of engine suction on the switch 97, or by the action of the generator on the relay winding 90. When this takes place, the pinion is automatically withdrawn from the flywheel gear and the starter switch opened while the engine continues to operate under its own power.

The construction of the magnet 41 may be varied within certain limits, but it is desirable that the coil 48 shall contain a smaller number of turns than the coil 50, and the resistance of the coil 48 should be higher than the coil 50 so that the flow of current through the coil 48 is as low as possible to insure that the armature of the magnet be held in switch closing position during the cranking operation, so as to change the position as little as possible. It has been found desirable to provide coils having such resistances that for a six volt battery system, the flow of current through coil 48 is substantially from 3 to 10 amperes and through the coil 50 from 40 to 50 amperes before the starter switch is closed. The flow of current through the coil 50 is very brief, as it takes an almost imperceptible time to effect closing of the starting motor switch so that during most of the starting operation there is only from 8 to 10 amperes flowing through the coil 48 to hold the starting motor switch closed and the pinion in gear-engaging position.

It has been found that in order to cause proper opening of the main starter switch upon opening of the ignition switch, or the switch 97, the number of turns in the inner, or "pull in" coil must be somewhat greater than the number of turns in the outer, or "hold in" coil. This is true because when either switch above referred to, is opened while the starter switch is closed, current will flow from the battery through the starter and thence through the coils of the magnet to ground, the direction of current in the inner coil being the reverse of that in the outer coil.

As a concrete example of the operation it may be assumed that the switch 97 is opened by suction and the starter switch should open immediately. On opening of switch 97, however, current will flow from the battery to ground through connection 62 and from the battery through wire 58, the starter switch, wires 52 and 110 through the coil 50, thence through wire 108, the coil 48 and wire 106 to ground, the direction of flow through coil 50 being reversed while the direction of flow through coil 48 remains the same. At this time the coils tend to neutralize each other and in order to insure that the magnetic flux passes through the zero point immediately, a slightly larger number of turns are used in the inner coil. The outer coil 48 comprises 122 turns of #16 B. E. copper wire, and the inner coil 127 turns of #11½ B. E. copper wire. With this arrangement, as the flux passes through the zero point upon reversal of polarity of the inner coil on opening of the suction operated switch, the magnet becomes completely de-energized and the starter switch is opened by the spring 164, as the spring 47 retracts the armature 40 and demeshes the pinion 30.

Theoretically, it might be possible to effect opening of the starter switch with coils having the same number of turns, but owing to the residual magnetism of the magnet, inequalities in the wire resulting in varying resistances, and manufacturing inaccuracies, it is impossible to use coils of the same number of turns as the magnetic flux might not reach zero value. To make sure that the flux pressure does always pass through the zero point, it is necessary to provide at least a few more turns in the inner coil than the outer.

Figure 2A:
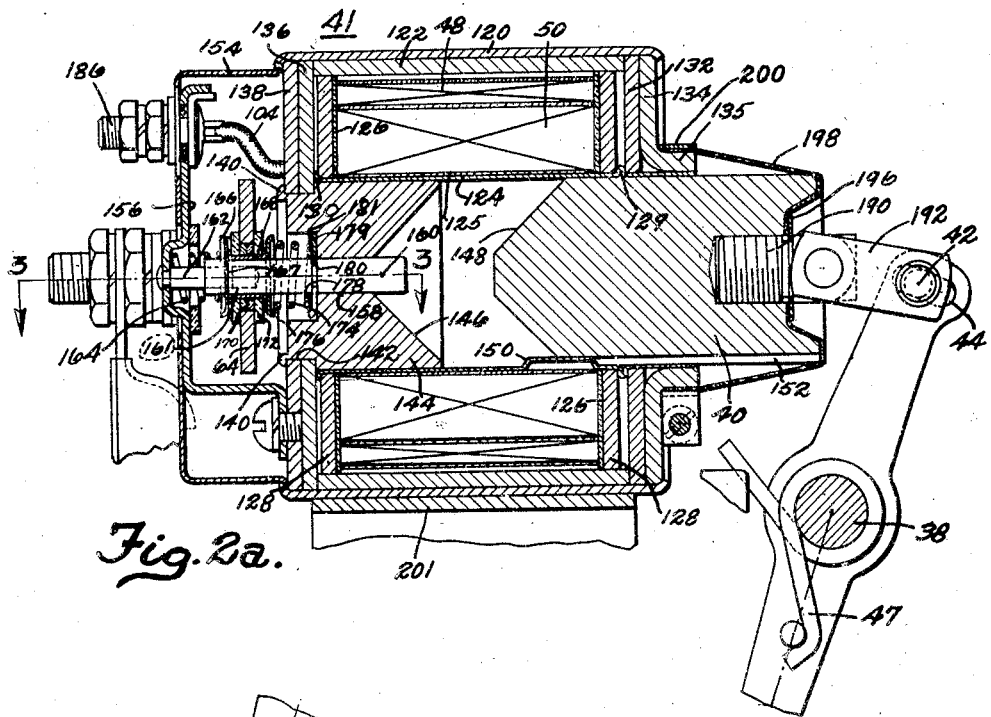
Figs. 2 and 2a are sectional views of the magnet and the starter drive.
Figure 3:
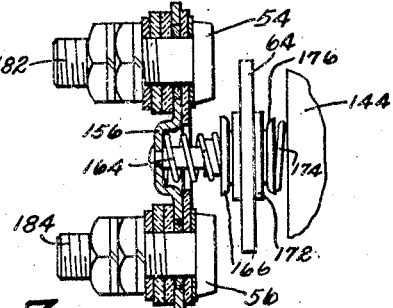

In Figs. 2a and 3, the specific construction of the magnet 41 is fully illustrated. The magnet 41 comprises an outer shell 120 enclosing an inner shell 122 which in turn encloses a spool comprising a brass tube or sleeve 124 surrounded by an insulating tube 125, insulating washers 126 and steel washers 128, said tube and washers being held in place between an annular rib 129 and an annular flange 130 provided by the tube or the sleeve 124. Upon this spool are wound the coils 50 and 48. The shell assembly comprising the members 120 and 122 is closed at the right hand end by a cover assembly comprising a washer 132 and a washer 134 having a neck or flange 135 which supports the right end of the sleeve 124. The left end of the shell assembly is closed by an assembly of washers 136 and 138 which are riveted together by spinning over at 140 the reduced shank 142 of a core 144 having a conical recess 146 for receiving the companion conical extension 148 of the armature 40 which slides in the sleeve 124 and is prevented from turning therein by providing the sleeve 124 with a lug 150 received by a groove 152 provided in the armature 40. When the magnet 41 is energized the armature extension 148 moves into the recess 146 and seats upon the core 144 thereby forming a magnetic seat therewith. The metallic parts of the magnet 41 are magnetizable with the exception of the sleeve 124 which is made of brass or other non-magnetizable metal. The sleeve flange 130 being received between one of the end plates 136 and one of the washers 126 and the rib 129 being received between the end washer 132 and the other washer 126, prevents any longitudinal shifting of the spool and windings.

Suitably secured by screws or in any other desirable way at the end of the magnet opposite to that in which the armature slides is a housing 154 which encloses the fixed contacts 54 and 56 of the starting motor switch, these contacts being carried by a suitable bracket 156 secured by screws 156a to the end washer 138 and received within the housing 154.

Figure 2:
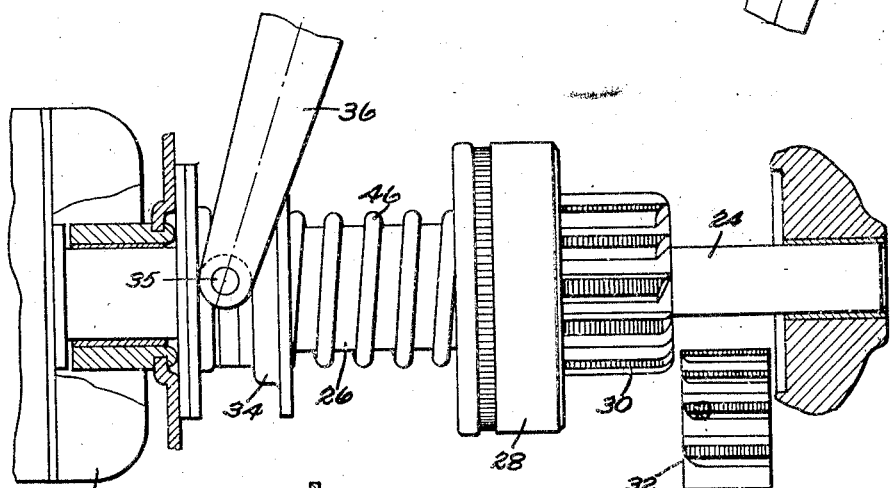

The core 144 has an axial bore 158 in which a metal plunger 160 is adapted to slide and which normally occupies the position shown in Fig. 2 with one of its ends projecting into the depression 146 so that it is adapted to be engaged by the armature 40 as the latter moves to the left upon energization of the magnet. The opposite end of the plunger 160 is bored at 161 and receives a pin 162 which is riveted in the bracket 156 and upon which the plunger 160 slides when engaged by the armature 40. A spring 164 which normally holds the switch open, is received between the bracket 156 and a suitable cup-shaped C-washer 166, which is received by a groove 167 of the plunger 160. Against the washer 166 normally rests a flanged collar 168 which is slidable upon the plunger 160 and has mounted thereon between the flanges thereof, the movable contact member 64 of copper or other suitable metal. The contact member 64 has a central hole through which the collar 168 extends and which is larger than the collar and is separated therefrom by insulating washers 170, while between the contact member 64 and the flanges of said collar 168 are insulating washers 172. A spring 174 surrounds the plunger 160 and is located between a cupped washer 176 (not a C-washer) and a plain washer 178 held by the spring 174 against a C-washer 179 which is received by a groove 180 of the plunger 160. The spring 174 and the washers 178 and 179 are received by a recess 181 provided by the core 144, as shown in Fig. 2. The spring 174, therefore, exerts a pressure urging the contact assembly carried by collar 168 against the washer 166.

The contacts 54 and 56 are formed on the ends of binding posts 182 and 184 respectively, to which the wires 58 and 52 are respectively connected, suitable insulating washers being provided to insulate the contacts from the supporting bracket and suitable means being provided to connect the wires referred to, to the binding post. The contact 54 is connected by the wire 110 to the coil 50. The bracket 156 also carries a binding post 186 suitably insulated from the bracket and connected by wire 104 with the coil 48 and wire 108 with the coil 50.

The armature 40 is connected to the pinion shifting lever 36 through the medium of a bolt 190 screwed into the end of the armature and connected through the medium of coupling links 192 to the upper end of the lever 36, a suitable pin 42 passing through holes in the coupling links and a suitable slot 44 formed in the upper end of the lever 36. This lost motion between the armature and the lever 36 is provided to permit some movement of the armature relative to the lever in case the engine fails to start or the battery fails to turn the engine crank shaft. When this takes place, the friction is so great between the pinion and flywheel teeth because of the torque of the starting motor that the spring 47 is not sufficient to disengage the pinion from the gear upon opening of the ignition switch, or switch 97, and the starter switch would remain closed resulting in complete discharge of the battery unless means is provided to cause the starter switch to open. The lost motion connection permits movement of the armature to de-energized position without movement of the lever 36 upon opening of the ignition switch or switch 97. This permits the starting motor switch to open and immediately the torque of the motor ceases, the friction between pinion and gear teeth disappears and the lever 36 and associated parts can return to normal position.

The bolt 190 screwed into armature 40, secures to the armature a washer 196 which is adapted to be engaged by the enlarged head of the bolt 190 so that a leather shield 198 may be clamped between the washer and the armature. This shield is adapted to be fitted around the neck 135 and clamped in position by a split clamp 200 which surrounds said neck and lies outside the leather shield. The purpose of this shield is to prevent dirt and moisture from reaching the armature.

The reference numeral 201 indicates a part of a supporting bracket which is secured in any desirable way to the bottom of the housing 120 and is adapted to be secured by bolts or otherwise to the top of the housing for the starting motor and support the magnet 41 in the desired position with respect to such starting motor. In actual practice the spring 47 is coiled around the pivot stud 38 of the lever 36, with one end engaging the lever as shown in Fig. 2, while the other end of the spring is fixed in some suitable manner as is the usual construction in manually operable starting devices of the pedal shift type.

The magnet upon energization effects three functions seriatim. As the armature moves to the left when the magnet is energized during the first part of its movement and before it engages the plunger 160, it shifts the starter pinion into engagement with the flywheel gear, then during its continued movement and before it engages the guide block 144, the plunger 160 is moved to first move the contact 64 into engagement with the contacts 54 and 56, and second, to compress the spring 174 so as to exert a heavy pressure on the contact 64 to insure that proper contact is made at the starter switch during the engine cranking operation.

As stated previously, the switch 97 is designed to be closed by operation of the accelerator pedal and to be opened by engine suction. This switch is best shown in Figs. 5 to 14 inclusive and comprises a cup-shaped sheet metal housing 210 which is closed at one end by a plate of insulating material 212 which supports the fixed contacts of the switch as is more fully described hereinafter, and at the other end is closed except for a small central opening. This housing is secured by rivets 214, one of which projects into the housing 210 to form a stop for a purpose later set forth, to a sheet metal shell 216 which forms part of a diaphragm chamber, a second similar shell 218 forming the other part of such chamber. These shells are flanged at their periphery and are joined in any suitable way so as to form a fluid tight joint with a flexible diaphragm 220 secured between the flanges of the shells. A supporting plate 222 has a projection 223 at its center which engages the shell 218 as indicated in Fig. 5, when the parts are assembled, so as to leave a space between the outer part of the plate and shell 218 so as to permit machine screws 224 to be positioned in suitable holes in the plate 222 with the heads of the screws between the shell 218, said plate providing a convenient means for supporting the switch unit, these screws being adapted to cooperate with some suitable bracket extending from some part of the engine or other suitable supporting means. The plate 222 is secured to shell 218 by a nipple 226 which has a reduced end 228 extending through aligned orifices in the shell 218 and plate 222, the end of this reduced portion being spun over the inner edge of the shell 218 to hold the shell and plate against a shoulder formed by the reduced portion of the nipple, as indicated in Fig. 5.

A reducing coupling 230 is screwed into the opposite end of the nipple and a suitable packing washer 232 is used to form a fluid tight joint. The nipple is partially closed by a partition 234 integral therewith and a hole of relatively small size 236 is provided therein through which the engine suction is communicated to the diaphragm. The end of the reducing coupling is threaded as indicated in Fig. 5, so as to be connected to a suitable suction connection extending to the intake manifold. A cup-shaped washer 238 is held against the diaphragm when the parts of the switch are assembled and received between this washer and the partition 234 in the reducing coupling is a spring 240 which, when the engine is not running, is adapted to hold the parts of the switch in the position shown in Fig. 5.

Journaled in the plate of insulating material 212 is a stud or spindle 242 to the outer end of which is secured the operating arm 84 in the outer end of which is an orifice 246 in which some suitable operating connection adapted to extend to the accelerator pedal may be secured. At the other end of the arm 84 is a bent over tang 248 adapted to cooperate with shoulders 250 and 252 formed on a raised portion of the plate 212 which act as stops to limit the movement of the operating arm, while a lug 253 projecting from the arm is adapted to cooperate with a suitable mark on the plate 212 to indicate where the arm should be positioned when adjusting its operating mechanism.

The arm 84 is secured by riveting or otherwise on a flattened extension 243 of the spindle or stud 242 which at the other end is provided with a reduced portion 254 which extends through an opening in a switch operating member 256 and is bent over the edge of said opening to secure the switch operating member against a shoulder formed by said reduced portion 254. The member 256 has lugs 258 projecting therefrom which are adapted to operate the movable switch contact, flanges 260 being provided on these lugs to engage a cooperating member carried by a rotatable carrier which supports the movable switch contact as hereinafter described.

The stud or spindle 242 is provided with an axial recess 261 in one end of which is supported a pin 262 on which the movable switch contact and the carrier therefor are rotatably supported and at its other end the pin 262 has a reduced extension 264 which extends through the diaphragm 220 and the washer 238, being riveted over the washer so that the pin is reciprocated in an axial direction as the diaphragm moves back and forth under the influence of engine suction. Secured between an enlarged part 266 of the pin, which projects through the opening in the housing 210 previously referred to, and the diaphragm 220, is a suitable metal washer 268 which serves to give the diaphragm assembly greater rigidity and strength.

Supported on the pin 262 immediately to the left of the enlarged portion 268 of such pin in Fig. 5 of the drawings is a carrier plate of insulating material 270 which supports the movable switch contact, the carrier plate, the contact and associated parts forming a subassembly unit best shown in Figs. 10 and 11. The movable contact is a ring 272 of brass or other suitable metal, having three raised segments 274 thereon which form contact surfaces adapted to be brought into contact with the fixed contacts 78 and 80 carried by the plate 212 and connected to binding posts 276 and 278 respectively, to which are connected the wires 76 and 86 previously referred to. Projecting from the movable contact 272 in a direction normal to the contacting surface and parallel to the axis of the pin 262 are tangs or lugs 280 which project through notches 282 in the carrier plate 270 and are bent over at the ends as indicated at 284, so that no relative rotary movement of the contact and carrier plate can take place. A coil spring 286 which is received between the movable contact and the plate 270 normally holds the parts in such position that the bent over portions 284 of the tangs engage the plate 270, as shown in Fig. 5, but permits movement of the contact toward the plate 270 under certain circumstances.

Adjacent the carrier plate 270 is a contact operating member 288 which is secured to the plate by lugs 290, which project through the carrier and extend into notches of a washer 292 on the opposite side of the plate 270, while a cross pin 294 passes through a hole in the pin 262 to hold the carrier plate 270 and the switch operating member 288 in position against the enlarged portion 268 of the pin 262, as shown in Fig. 5, so that the plate 270 moves with pin 262 as it is reciprocated by suction. As best shown in Figs. 5 and 10, the operating member 288 is provided with lugs 296 extending in a direction parallel to the axis of the pin 262 and projecting into spaces between the flanges 260 of the lugs 258 which extend from the member 256, so that when member 256 is rotated, the flanges 260 will engage the lugs 296 to rotate the carrier 270 and the movable contact 272. The members 254 and 288 form a sort of switch operating clutch which is released by engine suction.

The carrier plate 270 is also provided with projecting lugs 298 which cooperate with the post 214 to limit the movements of the carrier 270 and the switch contact carried thereby. A spring 300 is received between the washer 292 and the closed end of the housing 210 and cooperates with springs 240 and 286 to normally hold the carrier plate and movable contact carried thereby in the position shown in Fig. 5 with the movable contact engaging the plate of insulating material 212, but in such position that the contact surfaces 274 engage the surface of the plate 212 between the fixed contacts 78 and 80, so that in order for the contacts to be closed, the arm 84 must be operated to rotate the movable contact into engagement with the fixed contacts. This spring 300 has one end 301 exending through a hole in the housing 210 and the other end through a hole 302 in the washer 292 and in the plate 270 so that such spring exerts a force tending to rotate the plate 270 and parts carried thereby in a counter-clockwise direction, tending to hold the plate in the position shown in Fig. 7, with a lug 298 engaging the post 214. The spring also operates to return the plate to this position after the plate has been moved clockwise to close the switch contacts by operation of arm 84.

The operation of the switch is substantially as follows. When the engine is not running and the parts are in normal position they occupy the position shown in Fig. 7 with the contact surfaces 274 in engagement with the insulating plate. In order to close the contacts the operating arm 84 is moved in a clockwise direction causing the flanges 260 to engage the lugs 296 rotating the plate 270 and movable contact carried thereby so as to bring the parts to the position shown in Fig. 8 in which position the contact surfaces 274 engage the contacts 78 and 80. As previously described, this will cause the starting motor to become operative and the arm 84 may be moved to whatever position is desired so that the throttle may be opened to its fullest extent without moving the contact surfaces 274 out of engagement with the contacts 78 and 80. The contacts 78 and 80 are 120° apart, while the arm 84 only moves 90° from fully closed to fully open position of the throttle so that after contact, the surfaces of the movable contact are brought opposite contacts 78 and 80 and they remain opposite such contacts during the entire movement of arm 84 toward open throttle position, as long as the engine is not running, the suction during the cranking operation not being enough to overcome the pressure of springs 240 and 300.

When the engine starts running, suction is communicated to the right hand side of the diaphragm in Fig. 5, which will draw the diaphragm to the right overcoming the pressure of the springs 240 and 300, thus moving the pin 262 to the right and carrying the plate 270 and the whole movable contact assembly to the right, disengaging the movable contact from the contacts 78 and 80 and effecting the opening of the starting motor circuit in the manner previously described. As soon as the lugs 296 are disengaged from the flanges 260 during the movement of the member 288 to the right, the spring 300 rotates the plate 270 and contact 274 and other parts carried by the plate back to the position shown in Figs. 7 and 9, the arm 84 occupying the position shown in Figs. 8 or 9, or any intermediate position.

If, for any reason the suction falls when the operating arm 84 is in any position other than that shown in Fig. 7, the switch cannot be closed because upon movement of the plate 270 and parts carried thereby to the left, the lugs 296 would engage the flanges 260, stopping the movement of the contact 274 toward the left before it engages the surface of plate 212 to occupy its original position. Only when arm 84 is restored to the normal position shown in Fig. 7, so that lugs 296 lie opposite the notches between flanges 260 can the switch 97 be closed subsequent to opening of the switch by engine suction. Therefore, no matter what suction conditions are maintained during engine operation, the switch 97 cannot be accidentally closed as long as the engine continues to run.

While the embodiment of the present invention as herein disclosed, constitutes a preferred form, it is to be understood that other forms might be adopted, all coming within the scope of the claims which follow.

What is claimed is as follows:

1. Control apparatus for internal combustion engines comprising in combination, a starting motor, a current source for supplying current to said starting motor, a switch adapted to close the circuit between said starting motor and the current source, an electromagnet for controlling said switch, said electromagnet having a plurality of coils which are energized to close said starting motor switch, means for controlling the circuit connections of said electromagnet comprising means for shunting one of said coils when said starting motor switch is closed, and means operated by engine suction for preventing the energization of any of said coils during the operation of the engine under its own power.

2. Control apparatus for internal combustion engines comprising in combination, a starting motor, a current source for supplying current to said starting motor, a switch adapted to close the circuit between said starting motor and the current source, an electromagnet for controlling said switch, said electromagnet having a plurality of coils which are energized to close said starting motor switch, means for controlling the operation of said electromagnet comprising a plurality of manually closed switches, means for shunting one of said coils when the starting motor circuit is closed whereby one of the coils is ineffective to maintain the starting motor circuit closed during the cranking of the engine by said starting motor, and means operative when the engine is running under its own power for automatically holding one of switches open to prevent energization of all of said coils as long as the engine is in operation.

3. Control apparatus for internal combustion engines comprising in combination, a starting motor, a current source for supplying current to said starting motor, a switch adapted to close the circuit between said starting motor and the current source, an electromagnet for controlling said switch, said electromagnet having a plurality of coils which are energized to close said starting motor switch, means for controlling the circuit connections of said electromagnet comprising means for shunting one of said coils when said starting motor switch is closed, a generator, and means operated by the generator for preventing the energization of any of said plurality of coils during operation of the engine under its own power.

4. Control apparatus for internal combustion engines comprising in combination, a starting motor, a current source for supplying current to said starting motor, a switch adapted to close the circuit between said starting motor and the current source, an electromagnet for controlling said switch, said electromagnet having a plurality of coils which are energized to close said starting motor switch, means for controlling the circuit connections of said electromagnet comprising means for shunting one of said coils when said starting motor switch is closed, a generator, and means operated by the generator and by engine suction for preventing energization of any of the coils of said magnet as long as the engine operates under its own power.

5. Control apparatus for internal combustion engines comprising in combination, a starting motor, a current source for supplying current to said starting motor, a switch adapted to close the circuit between said starting motor and the current source, an electromagnet for controlling said switch, said electromagnet having a plurality of coils which are energized to close said starting motor switch, means for controlling the circuit connections of said electromagnet comprising means for shunting one of said coils when said starting motor switch is closed, a generator, a plurality of means for preventing energization of any of the coils of said magnet as long as the engine is running under its own power and means whereby one of said means is operable by engine suction and the other of said means is operated by the generator.

6. Control apparatus for internal combustion engines comprising in combination, a starting motor, a current source for supplying current to said starting motor, a switch adapted to close the circuit between said starting motor and the current source, an electromagnet for controlling said switch said electromagnet having a plurality of coils which are energized to close said starting motor switch, means for controlling the circuit connections of said electromagnet comprising means for shunting one of said coils when said starting motor switch is closed, a generator, a plurality of switches for controlling said electromagnet each of which is adapted to prevent energization of the magnet when open and means whereby one of said switches is controlled by engine suction and the other by the generator.

7. Control apparatus for internal combustion engines comprising in combination a starting motor, means for controlling the quantity of combustible mixture supplied to the engine, a current source for supplying current to said starting motor, an electromagnet for controlling the circuit between the starting motor and said current source, said electromagnet having a plurality of coils which are energized to effect closing of the circuit between the starting motor and current source, means for shunting one of said coils when said circuit is closed so that the shunted coil is ineffective to hold said circuit closed, a switch adapted to be closed by the means which controls the quantity of combustible mixture supplied to the engine for causing said plurality of coils to be energized and means operated by engine suction to hold said switch open and cause all of said coils to be de-energized while the engine is self operative.

8. Control apparatus for internal combustion engines comprising in combination a starting motor, a current source for supplying current to said starting motor, an electromagnet for controlling the circuit between the starting motor and said current source, said electromagnet having a plurality of coils which are energized to effect closing of the circuit between the starting motor and current source, means for shunting one of said coils when said circuit is closed so that said circuit is held closed by another of said coils, a plurality of switches, all of which must be closed to cause energization of the electromagnet, and means operable by engine suction to hold one of said switches open while the engine is running under its own power so as to cause the magnet to be de-energized.

9. Control apparatus for internal combustion engines comprising in combination, means for controlling the quantity of combustible mixture supplied to the engine, a starting motor, a current source for supplying current to said starting motor, an electromagnet for controlling the circuit between the starting motor and said current source, said electromagnet having a plurality of coils which are energized to effect closing of the circuit between the starting motor and current source, means for shunting one of said coils when said circuit is closed so that said shunted coil is ineffective to hold said circuit closed, a plurality of switches including a switch adapted to be closed by the means which controls the quantity of combustible mixture supplied to the engine, means whereby said plurality of switches must be closed to cause energization of the electromagnet, and means operable automatically to open the switch operated by the mixture controlling means when the engine is operating under its own power to cause the magnet to be de-energized.

10. Control apparatus for internal combustion engines comprising in combination, means for controlling the quantity of combustible mixture supplied to the engine, a starting motor, a current source for supplying current to said starting motor, an electromagnet for controlling the circuit between the starting motor and said current source, said electromagnet having a plurality of coils which are energized to effect closing of the circuit between the starting motor and current source, means for shunting one of said coils when said circuit is closed so that said shunted coil is ineffective to hold said circuit closed, a plurality of switches including a switch adapted to be closed by the means which controls the quantity of combustible mixture supplied to the engine, means whereby said plurality of switches must be closed to cause energization of the electromagnet, and means operated by engine suction to hold the switch which is closed by the mixture controlling means open while the engine is operating under its own power so as to cause the magnet to be deenergized.

11. Control apparatus for internal combustion engines comprising in combination, a starting motor, a current source for supplying current to said starting motor, an electromagnet for controlling the circuit between the starting motor and said current source, said electromagnet having a plurality of coils which are energized to effect closing of the circuit between the starting motor and current source, means for shunting one of said coils when said circuit is closed so that said shunted coil is ineffective to hold the circuit closed, a generator, a plurality of manually operable switches and a switch controlled by the generator all of which must be closed to cause energization of the electromagnet, and means whereby the generator causes said last named switch to be opened to effect deenergization of the magnet when the engine is operating under its own power.

12. Control apparatus for internal combustion engines comprising in combination, a starting motor, a current source for supplying current to said starting motor, an electromagnet for controlling the circuit between the starting motor and said current source, said electromagnet having a plurality of coils which are energized to effect closing of the circuit between the starting motor and current source, means for shunting one of said coils when said circuit is closed so that said shunted coil is ineffective to hold said circuit closed, a plurality of manually operated switches all of which must be closed to effect energization of the magnet, a magnetic switch also controlling the operation of said magnet and adapted to be closed upon closing of said manually operated switches, a generator and means whereby the generator causes the magnetic switch to be held open when the engine is running under its own power so that the magnet cannot be energized during engine operation.

13. Control apparatus for internal combustion engines comprising in combination, means for controlling the quantity of combustible mixture supplied to the engine, a starting motor, a current source for supplying current to said starting motor, an electromagnet for controlling the circuit between the starting motor and said current source, said electromagnet having a plurality of coils which are energized to effect closing of the circuit between the starting motor and current source, means for shunting one of said coils when said circuit is closed so that said shunted coil is ineffective to hold said circuit closed, an ignition switch, a switch adapted to be closed by the means which controls the quantity of combustible mixture supplied to the engine, circuit connections so arranged that both of said switches must be closed to cause energization of said magnet, and means operated by the engine for opening the switch operated by the mixture controlling means when the engine is operating under its own power to cause said magnet to be deenergized.

14. Control apparatus for internal combustion engines comprising in combination, means for controlling the quantity of combustible mixture supplied to the engine, a starting motor, a current source for supplying current to said starting motor, an electromagnet for controlling the circuit between the starting motor and said current source, said electromagnet having a plurality of coils which are energized to effect closing of the circuit between the starting motor and current source, means for shunting one of said coils when said circuit is closed so that said shunted coil is ineffective to hold said circuit closed, an ignition switch, a switch adapted to be closed by the means whch controls the quantity of combustible mixture supplied to the engine, means whereby both of said switches must be closed to cause energization of said magnet, and means operated by the engine suction for holding the switch which is closed by the mixture controlling means open while the engine is operating under its own power so as to cause the magnet to be deenergized.

15. Control apparatus for internal combustion engines comprising in combination, means for controlling the quantity of combustible mixture supplied to the engine, a starting motor, a current source for supplying current to said starting motor, an electromagnet for controlling the circuit between the starting motor and said current source, said electromagnet having a plurality of coils which are energized to effect closing of the circuit between the starting motor and current source, means for shunting one of said coils when said circuit is closed so that said shunted coil is ineffective to hold said circuit closed, an ignition switch, a switch adapted to be closed by the means which controls the quantity of combustible mixture supplied to the engine, means whereby both of said switches must be closed to cause energization of said magnet, a third switch also controlling the operation of said electromagnet and means operated by the engine for opening both of said last named switches during operation of the engine under its own power.

16. Control apparatus for internal combustion engines comprising in combination, means for controlling the quantity of combustible mixture supplied to the engine, a starting motor, a current source for supplying current to said starting motor, an electromagnet for controlling the circuit between the starting motor and said current source, said electromagnet having a plurality of coils which are energized to effect closing of the circuit between the starting motor and current source, means for shunting one of said coils when said circuit is closed so that said shunted coil is ineffective to hold said circuit closed, an ignition switch, a switch adapted to be closed by the means which controls the quantity of combustible mixture supplied to the engine, means whereby both of said switches must be closed to cause energization of said magnet, a third switch also controlling the operation of said electromagnet and adapted to be closed when the magnet is energized, a generator, and means whereby the generator causes the opening of said third switch when the engine is running under its own power to prevent energization of the magnet during engine operation.

17. Control apparatus for internal combustion engines comprising in combination, means for controlling the quantity of combustible mixture supplied to the engine, a starting motor, a current source for supplying current to said starting motor, an electromagnet for controlling the circuit between the starting motor and said current source, said electromagnet having a plurality of coils which are energized to effect closing of the circuit between the starting motor and current source, means for shunting one of said coils when said circuit is closed so that said shunted coil is ineffective to hold said circuit closed, an ignition switch, a switch adapted to be closed by the means which controls the quantity of combustible mixture supplied to the engine, means whereby both of said switches must be closed to cause energization of said magnet, a third switch also controlling the operation of said electromagnet and adapted to be closed when the magnet is energized, a generator, means operated by engine suction to open the switch operated by the mixture controlling means during operation of the engine under its own power, means for preventing the closing of the last mentioned switch during operation of the engine, and means whereby the generator causes said third switch to be opened and prevents the closing thereof as long as the engine is operating under its own power.

18. Control apparatus for internal combustion engines comprising, in combination, a starting motor, a current source for supplying current to said starting motor, a switch adapted to close the circuit between the starting motor and the current source, an electromagnet having a plurality of coils which are energized to close the starting motor switch, means for shunting one of said coils when the starting motor switch is closed, so that during engine cranking operation the shunted coil is ineffective, a magnetic switch in circuit with all coils of said magnet and adapted to be closed to cause energization of said coils, a control circuit for the magnetic switch and a plurality of manually operable switches in said control circuit for controlling the operation of said magnetic switch.

19. Control apparatus for internal combustion engines comprising, in combination, a starting motor, a current source for supplying current to said starting motor, a switch adapted to close the circuit between the starting motor and the current source, an electromagnet having a plurality of coils which are energized to close the starting motor switch, means for shunting one of said coils when the starting motor switch is closed, so that during engine cranking operation the shunted coil is ineffective, a magnetic switch in circuit with all coils of the magnet and adapted to be closed to cause energization of said coils, a control circuit for said magnetic switch, a plurality of manually operable switches in said control circuit for controlling the operation of said magnetic switch, including a switch adapted to be operated by the means for controlling the quantity of combustible mixture supplied to the engine cylinders, and means operated automatically when the engine is operating under its own power to open said last named switch to cause said magnetic switch to open.

20. Control apparatus for internal combustion engines comprising, in combination, means for controlling the quantity of combustible mixture supplied to the engine, a starting motor, a current source for supplying current to said starting motor, a switch adapted to close the circuit between the starting motor and the current source, an electromagnet having a plurality of coils which are energized to close the starting motor switch, means for shunting one of said coils when the starting motor switch is closed, so that during engine cranking operation the shunted coil is ineffective, a magnetic switch in circuit with all coils of the magnet and adapted to be closed to cause energization of said coils, a control circuit for said magnetic switch, a plurality of manually operable switches in said control circuit for controlling the operation of said magnetic switch, including a switch adapted to be operated by the means for controlling the quantity of combustible mixture supplied to the engine cylinders, and means operated by engine suction when the engine is operating under its own power to open said last named switch to cause said magnetic switch to open.

21. Control apparatus for internal combustion engines comprising, in combination, a starting motor, a current source for supplying current to said starting motor, a switch adapted to close the circuit between the starting motor and the current source, an electromagnet having a plurality of coils which are energized to close the starting motor switch, means for shunting one of said coils when the starting motor switch is closed, so that during engine cranking operation the shunted coil is ineffective, a magnetic switch in circuit with all coils of the magnet and adapted to be closed to energize said coils, a control circuit for said magnetic switch, a plurality of manually operable switches in said control circuit for controlling the operation of said magnetic switch, means operable by engine suction for opening one of said manually operable switches to effect opening of the magnetic switch during operation of the engine under its own power, a generator and means whereby the generator directly controls the operation of said magnetic switch.

22. Control apparatus for internal combustion engines comprising, in combination, means for controlling the quantity of combustible mixture supplied to the engine, a starting motor, a current source for supplying current to said starting motor, a switch adapted to close the circuit between the starting motor and the current source, an electromagnet having a plurality of coils which are energized to close the starting motor switch, means for shunting one of said coils when the starting motor switch is closed, so that during engine cranking operation the shunted coil is ineffective, a magnetic switch in circuit with all coils of the magnet and adapted to be closed to magnetize said coils, a control circuit for said magnetic switch, a plurality of manually operable switches in said control circuit for controlling the operation of said magnetic switch, including a switch adapted to be operated by the means for controlling the quantity of combustible mixture supplied to the engine cylinders, means operated automatically when the engine is operating under its own power to open said last named switch and cause said magnetic switch to open, a generator, and means whereby the generator directly controls said magnetic switch, so as to also cause said magnetic switch to open when the engine is in operation.

23. Control apparatus for internal combustion engines comprising, in combination, a starting motor, a current source for supplying current to said starting motor, a starter switch adapted to close the circuit between the starting motor and the current source, an electromagnet for operating said switch and having a plurality of coils, a control switch for said electromagnet and circuit connections for said electromagnet so arranged that when the control switch is closed, the coils of said magnet act cumulatively to effect closing of the starter switch and upon opening of the control switch said coils act differentially to effect opening of the starter switch.

24. Control apparatus for internal combustion engines comprising, in combination, a starting motor, a current source for supplying current to said starting motor, a starter switch adapted to close the circuit between the starting motor and the current source, an electromagnet for operating said switch and having a plurality of coils, a control switch for said electromagnet and circuit connections for said electromagnet so arranged that when the control switch is closed, current is caused to flow through the coils in the same direction whereby the coils are cumulatively effective to exert a force for closing the starter switch and upon opening of the control switch current is caused to flow through the coils in opposite directions whereby the coils tend to counteract each other, so as to permit opening of the starter switch upon opening of the control switch.

25. Control apparatus for internal combustion engines comprising, in combination, a starting motor, a current source for supplying current to said starting motor, a starter switch adapted to close the circuit between the starting motor and the current source, an electromagnet for operating said switch, said electromagnet having two coils which are energized to close said switch and so constructed that the magnetic flux thereof is unequal, a switch for controlling the magnet and adapted when closed to cause energization of both said coils, and means operable when said control switch is opened to cause the current to flow in opposite directions through the two coils, whereby the effect of one coil tends to counteract the other to permit opening of the starter switch upon opening of the control switch.

26. Control apparatus for internal combustion engines comprising, in combination, a starting motor, a current source for supplying current to said starting motor, a starter switch adapted to close the circuit between the starting motor and the current source, an electromagnet for operating said switch and having a plurality of coils of unequal magnetic flux, a control switch for said electromagnet and circuit connections for said electromagnet so arranged that when the control switch is closed the coils of said magnet act cumulatively to close the starter switch and means operable when said control switch is opened to cause the direction of current flow through the coil exerting the greater flux pressure to be reversed, whereby the effect of one coil tends to counteract the other so as to permit opening of the starter switch upon opening of the control switch.

27. Control apparatus for internal combustion engines comprising, in combination, a starting motor, a current source for supplying current to said starting motor, a starter switch adapted to close the circuit between the starting motor and the current source, an electromagnet for operating said switch and having a plurality of coils, a control switch for said electromagnet and circuit connections for said electromagnet so arranged that when the control switch is closed the coils of said magnet act cumulatively to effect closing of the starter switch, means for shunting one of said coils when the starter switch is closed, and means effective when the control switch is opened to cause current to flow through the shunted coil in a direction opposite to the direction of flow in the other coil, whereby the effect of one coil tends to counteract the other in order to permit opening of the starter switch upon opening of the control switch.

28. Control apparatus for internal combustion engines comprising, in combination, a starting motor, a current source for supplying current to said starting motor, a starter switch adapted to close the circuit between the starting motor and the current source, an electromagnet for operating said switch and having a plurality of coils, a plurality of control switches for said electromagnet, all of which must be operated in order to cause said magnet to be energized, and circuit connections for said electromagnet so arranged that when said control switches are closed the coils of said magnet act cumulatively to effect closing of the starter switch and upon opening of any one of the control switches said magnet coils act differentially to effect opening of the starter switch.

29. Control apparatus for internal combustion engines comprising in combination a starting motor, a current source for supplying current to said starting motor, a switch adapted to close the circuit between said starting motor and the current source, an electromagnet for controlling said switch and for controlling the driving connection between the starting motor and the engine, said electromagnet having a plurality of coils which are energized to close said starting motor switch and establish driving connection between the starting motor and the engine, means for controlling the circuit connections of said electromagnet comprising means for shunting one of said coils when said starting motor switch is closed, a generator, and means operated by the generator for causing the circuit through all of said coils to be broken when the engine is operating under its own power.

30. Control apparatus for internal combustion engines comprising in combination, a starting motor, a current source for supplying current to said starting motor, a switch adapted to close the circuit between said starting motor and the current source, an electromagnet for controlling said switch and for controlling the driving connection between the starting motor and the engine, said electromagnet having a plurality of coils which are energized to close said starting motor switch and establish driving connection between the starting motor and the engine, means for controlling the circuit connections of said electromagnet comprising means for shunting one of said coils when said starting motor switch is closed, a generator, and means operated by the generator and by engine suction for causing the circuit through all of said magnet coils to be broken when the engine is operating under its own power.

31. Control apparatus for internal combustion engines comprising in combination, a starting motor, a current source for supplying current to said starting motor, an electromagnet for controlling the circuit between the starting motor and said current source and for controlling the driving connection between the starting motor and the engine, said electromagnet having a plurality of coils which are energized to effect closing of the circuit between the starting motor and current source and establish driving connection between the starting motor and the engine, means for shunting one of said coils when said circuit is closed so that said shunted coil is ineffective to hold said circuit closed, a plurality of manually closed switches all of which must be closed to energization of the magnet, another normally open switch also controlling the magnet and adapted to be closed by the closing of said manually closed switches, a generator, and means whereby the generator causes said last named switch to be opened when the generator is operating at a predetermined speed.

32. Control apparatus for internal combustion engines comprising, in combination, a starting motor, a current source, an electromagnet having an armature adapted to close a circuit between the starting motor and said current source, means also operated by the magnet armature for establishing driving connection between the starting motor and the engine and means permitting movement of the armature relative to said last means, whereby the armature may move to a position to open the starting motor circuit without interrupting the driving connection between the starting motor and the engine.

33. Control apparatus for internal combustion engines comprising, in combination, a starting motor, a current source, an electromagnet adapted to close a circuit between the starting motor and said current source, means also operated by the magnet armature for establishing driving connection between the starting motor and the engine and a lost motion connection between said magnet armature and said last mentioned means, to permit movement of the magnet armature relative to said last mentioned means when the magnet is de-energized, whereby the armature may move to a position to open the starting motor circuit without interrupting the driving connection between the starting motor and the engine.

34. Control apparatus for internal combustion engines comprising, in combination, a starting motor, a current source, an electromagnet adapted to close a circuit between the starting motor and said current source, a driving member operated by said starting motor and adapted to be moved into engagement with a driven member on the engine adapted to be driven thereby, a lever connected to said driving member and adapted to be operated by the magnet armature to move the driving member into engagement with said driven member and a lost motion connection between said magnet armature and said lever, to permit movement of the magnet armature relative to said last mentioned means when the magnet is de-energized, whereby the armature may move to a position to open the starting motor circuit without interrupting the driving connection between the starting motor and the engine.

35. An electromagnetically controlled engine starter comprising, in combination, an electric motor having a field frame, an armature rotatable within the field frame, a shaft driven by the armature, a pinion driven by the shaft and slidable therealong into mesh with the gear of an engine to be started, means for shifting the pinion, a magnet housing mounted upon the motor frame, windings within the housing, a magnet armature slidably supported by the magnet housing, a switch for controlling the operation of the starting motor including fixed contact means supported by the magnet housing and movable contact means operated by said magnet armature, and means including a lost motion connection for connecting the armature with the pinion shifting means whereby the armature may move to a position to open the starting motor circuit without interrupting the driving connection between the starting motor and the engine.

36. Control apparatus for internal combustion engines comprising, in combination, a starting motor, a current source, an electromagnet having an armature adapted to close a circuit between the starting motor and said current source, a driving member operated by said starting motor and adapted to be moved into engagement with a driven member on the engine adapted to be driven thereby, a lever connected to said driving member and adapted to be operated by said magnet armature to move the driving member into engagement with said driven member, and means permitting relative movement between the armature and said lever whereby the armature may move to a position to open the starting motor circuit without any movement of the driving member relative to the driven member.

37. Control apparatus for internal combustion engines comprising in combination, a starting motor, a current source for supplying current to said starting motor, a switch adapted to close the circuit between said starting motor and the current source, an electromagnet for controlling said switch and for controlling the driving connection between the starting motor and the engine, said electromagnet having a plurality of coils which are energized to close said starting motor switch and establish driving connection between the starting motor and the engine, means for controlling the circuit connections of said electromagnet comprising means for shunting one of said coils when said starting motor switch is closed, a generator, and means operated by the generator and by engine suction for preventing energization of any of the coils of said magnet as long as the engine operates under its own power.

38. Control apparatus for internal combustion engines comprising in combination, a starting motor, a current source for supplying current to said starting motor, an electromagnet for controlling the circuit between the starting motor and said current source and for controlling the driving connection between the starting motor and the engine, said electromagnet having a plurality of coils which are energized to effect closing of the circuit between the starting motor and current source and establish driving connection between the starting motor and the engine, means for shunting one of said coils when said circuit is closed so that said shunted coil is ineffective to hold said circuit closed, a plurality of switches, all of which must be closed to cause energization of the electromagnet, means operable by engine suction to open one of said switches when the engine starts running under its own power to cause said magnet to be de-energized, and means for preventing the closing of said switch as long as the engine is running.

JOHN B. DYER.